May 1, 1956     A. L. TEAGUE     2,743,745
DOUBLE-CUT POWER BAND SAW MACHINE
Filed Sept. 20, 1954     2 Sheets-Sheet 1
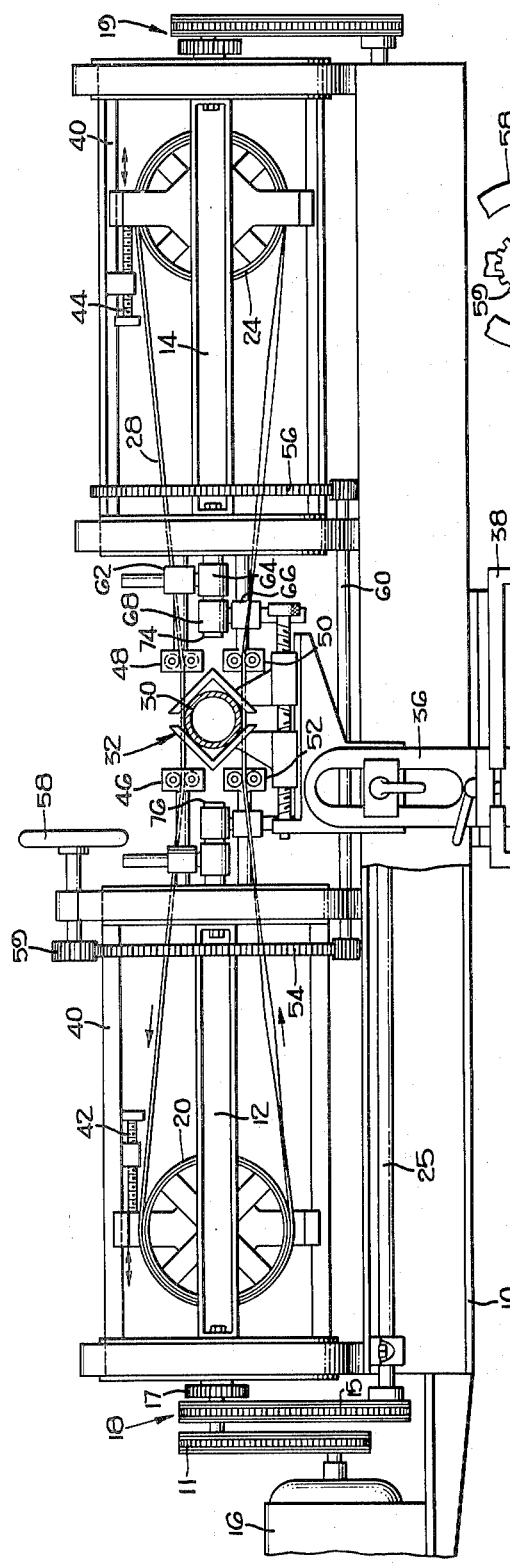
ARNOLD L. TEAGUE,
INVENTOR.
BY
ATTORNEYS May 1, 1956 A. L. TEAGUE 2,743,745
DOUBLE-CUT POWER BAND SAW MACHINE
Filed Sept. 20, 1954 2 Sheets-Sheet 2
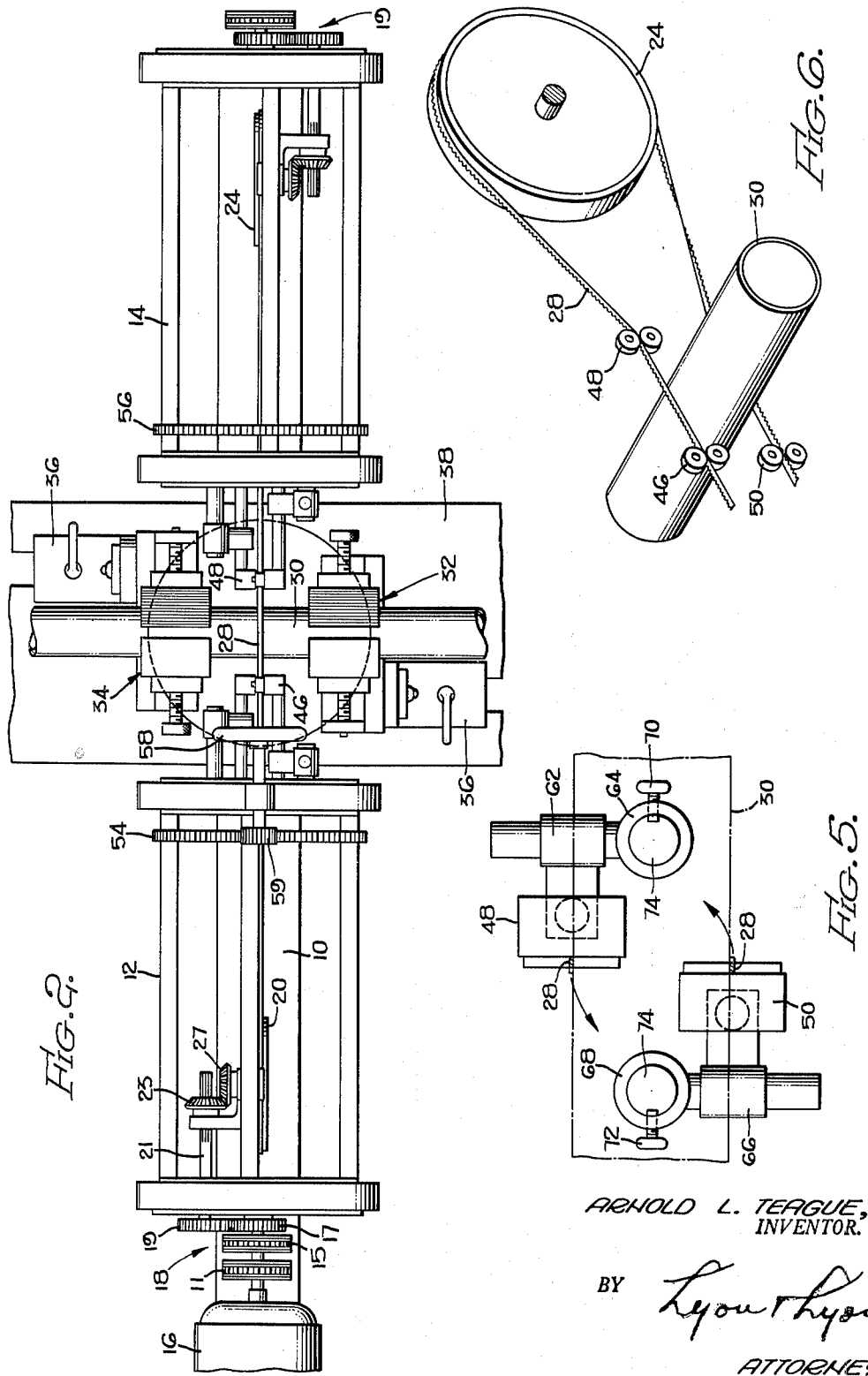
ARNOLD L. TEAGUE,
INVENTOR.
BY Lyon & Lyon
ATTORNEYS

United States Patent Office 2,743,745
Patented May 1, 1956

2,743,745

DOUBLE-CUT POWER BAND SAW MACHINE

Arnold L. Teague, Arroyo Grande, Calif.

Application September 20, 1954, Serial No. 456,935

10 Claims. (Cl. 143—17)

This invention relates to power-driven bandsaw machines, and, more particularly, to improvements therein. Power-driven endless bandsaws are known which usually include two pulleys, upon which an endless bandsaw is mounted. The pulleys are driven and work is pushed against the saw in order to effectuate the cut.

A feature of this invention is the provision of an endless bandsaw machine wherein the work is held stationary and the bandsaw is moved through the work.

Another feature of this invention is to provide an endless bandsaw machine wherein both saw edges of the bandsaw are employed for cutting the work.

Still another feature of the present invention is the provision of a bandsaw machine that permits adjusting the saw blade to different radii in order to make different cuts simultaneously.

Still another feature of this invention is the provision of a bandsaw machine which makes two cuts simultaneously at various angles.

These and other features of the invention are achieved by providing two pulleys which are mounted with their axes parallel and their diameters in a plane. An endless bandsaw is mounted over the pulleys with one side given a twist. Four pairs of guide rollers are employed to hold the bandsaw and direct it upon a workpiece which is inserted between the two loops of the bandsaw. The four pairs of guide rollers are positioned two on each side of a loop and one on each side of the work. In view of the twist, the cutting edges face in opposite directions. Means are provided for driving the pulleys and for rotating the pulleys and roller guides simultaneously about the common diameter extending between the pulleys and through the work. In this manner a double cut is made through the work. The roller guides are adjustable in position in order to permit varying the width of the loop.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1 is a plan view of the embodiment of my invention;

Figure 2 is a view in elevation of the bandsaw lathe shown in Figure 1;

Figure 3 (sheet 1) is a section through the driving mechanism for the lathe shown in Figure 1;

Figure 4 is a section through one of the pulleys shown in Figure 1;

Figure 5 (sheet 2) is a section through the roller guides shown in Figure 1; and Figure 6 shows in perspective view the position of the saw blade cutting edge, roller guides, and one pulley with respect to the work.

Referring now to Figure 1, there will be seen a plan view of an embodiment of my invention. A frame 10 provides support for a pair of housings 12 and 14, which are rotatably mounted on the frame. A motor 16 through suitable driven reduction gearing and belts 18 drives a pulley 20. It also drives another pulley 24 by means of a rotatably mounted shaft 25 extending through the frame and through driven gearing and belts 19.

The manner of pulley drives from the motor may better be seen by regarding Figure 3 in conjunction with Figures 1 and 2. As seen in Figures 1 and 2, the motor drives a first gear drive belt 11. This rotates a shaft on which are mounted two gears. One of these 13 drives a second gear drive belt 15 which drives the shaft 25. The other gear 17 drives a third gear 19. This third gear drives a shaft 21 having a filleted end. On this end there is slidably engaged a bevel gear 23. This bevel gear engages and drives another bevel gear 27 mounted on a common shaft with the pulley (see Figures 2 and 4). The pulley 24 is similarly driven from the shaft 25.

The two pulleys 20 and 24 are respectively rotatably mounted within the two housings 12 and 14. The pulleys are mounted with their diameters in a plane. A continuous bandsaw 28 is mounted over both pulleys. Before doing so, however, one of the sides of the bandsaw loop is given a twist.

The bandsaw which is looped over the two pulleys in the manner shown has inserted within its loop a workpiece 30 (see Figure 6). As shown, this may consist of bar stock which is held in place by two self-centering vises 32, 34. The vises are supported on a base 36 and are adjustable in position. The frame 10 is also rotatably supported on a base 38 so that it can be swung to enable the saw to pass at an angle through the workpiece other than a right angle. As may be seen from Figures 1, 2, and 4, the pulleys are rotatably supported in the frame in a key and keyway arrangement 40 so that by adjusting the screws 42, 44, the pulleys may be moved to tighten the bandsaw loop or slacken it, as desired. Motion of the pulleys, as shown in Figure 2, moves the driving bevel gear along the filleted rod 31 to always be in contact with and drive the bevel gear 27 mounted on the pulley shaft.

Four roller guides 46, 48, 50, 52 are employed to guide the bandsaw upon the work and support it against torque and for thrust. As may be seen in Figures 1, 2, and 6, these four guides are positioned on either side of the work along the sides of the bandsaw loops. The positions of the respective roller guides are adjustable, in order to enable cuts of varying lengths.

Around each of the housings are gear bands 54, 56. These enable the housings to be manually rotated by means of the hand wheel 58 mounted on the frame. This hand wheel is used to turn a gear 59 which engages one gear band. The other side of the gear band engages a shaft 60 having two gears, one on each end. These gears respectively engage the gear bands 54, 56 and provide for the simultaneous rotation of both housings, thus rotating both pulleys and the bandsaw.

In operation, the stock or workpiece is mounted in the two self-centering vises. The bandsaw loop is adjusted to the desired width of cut by adjusting the positions of the roller guides along the bandsaw sides. The angle of cut is adjusted by rotating the housing to the desired angle upon the base. The handwheel is then rotated to turn both housings and, accordingly, both pulleys and the bandsaw to be in position to cut. The motor is then started and the bandsaw is driven. By further manipulation of the hand wheel 58, the cutting of the work is commenced. The handwheel is turned as the cut goes deeper, in well known manner. It will be appreciated that by adjusting the angle of the frame with respect to the work any desired angle of cutting is obtainable, and by adjusting the roller guides plus the distance between the two pulleys any desired width of cut stock is made.

The roller guides are adjustable, both along the direction of the axis of rotation and at right angles thereto by means of the sleeve mountings 62, 64, 66, 68 on rods which can be more readily seen in detail in Figure 5. These sleeve mountings can be clamped in place using set screws 70, 72. To permit the proper motion of the roller guides with the rotating bandsaw, they are clamped on bars 74, 76, extending from the center of each of the housings.

Accordingly, there has been described and shown a novel and useful power-driven bandsaw machine which employs both cutting runs of the bandsaw simultaneously to make cuts in stock of any desired angle with reference to the stock. The cut is double and both saw and saw-holding frame are made adjustable to achieve the desired cutting angle.

I claim:

1. A driven, endless bandsaw machine for cutting a workpiece comprising a pair of driven rotatably supported spaced pulleys, an endless bandsaw blade, means to mount said saw blade upon said two pulleys to provide a saw blade loop with saw edges on two loop sides facing in opposite directions, means to hold said workpiece inside said saw blade loop, and means to rotate said pulleys about a line passing through them and at right angles to their axis to urge both saw edges against said workpiece held by said means to hold.

2. A saw machine as recited in claim 1 wherein there are included means to adjust the width of said loop comprising four guide rollers, means to adjustably position each guide roller, said guide rollers being positioned to guide said bandsaw with two being positioned along each bandsaw loop with one of said two on either side of said workpiece, the width of said bandsaw loop at said workpiece being determinable by said adjustable positioning means, and means to rotate said guide rollers simultaneously with said pulleys.

3. A driven, endless bandsaw machine for cutting a workpiece comprising a pair of spaced pulleys, a pair of spaced housings, means to rotatably mount each of said spaced pulleys in a respective one of said housings with the diameters of both said pulleys substantially in a single plane, an endless bandsaw, means to mount said saw blade on said two pulleys to provide a saw blade loop with saw edges on the upper and lower loop sides facing in opposite directions, means to hold said workpiece inside said saw blade loop, four guide rollers, a means for each of said guide rollers to adjustably position each of said guide rollers along said bandsaw, a different two of said guide rollers being positioned along each bandsaw loop on either side of said workpiece, the width of said bandsaw loop at said workpiece being determinable by said adjustable positioning means, means to attach said means to adjustably position said guide rollers to said housings, means to drive said pulleys, and means to rotate said housings together about the common axis line formed by the extension of a diameter of each pulley, to urge both said saw blade saw edges against said workpiece held by said means to hold.

4. A driven, endless bandsaw machine as recited in claim 3 wherein said means to rotatably mount each of said spaced pulleys in a respective one of said frames includes means to move said pulleys along said common axis of rotation to permit adjustment of the width of said bandsaw loop by said guide rollers.

5. A driven, endless bandsaw machine for cutting a workpiece comprising a pair of spaced pulleys, a pair of spaced housings, means to rotatably mount each of said pulleys in a different one of said housings with the diameters of both said pulleys substantially in a single plane, a pair of spaced frames, means to mount each of said housings in said frames to be rotatable about the common axis line formed by extending a diameter of each pulley, an endless bandsaw having one side twisted and being mounted over said pulleys to provide a saw blade loop with saw edges on the upper and lower loop sides facing in opposite directions, means to hold said workpiece inside said saw blade loop, means to adjust the width of said saw blade loop, means to drive said pulleys, and means to rotate said housings together about said common axis line to urge both said saw blade edges against said workpiece.

6. A driven, endless bandsaw as recited in claim 5 wherein said means to adjust the width of said saw blade loop includes means to move said rotatably mounted pulleys in said housings along said common axis line, four guide rollers, a separate means for adjustably positioning each of said guide rollers along said bandsaw to train said bandsaw upon said workpiece, and means to attach said separate means for adjustably positioning said guide rollers to said housing to be rotatable therewith.

7. In a driven bandsaw machine for cutting a workpiece, an endless bandsaw blade, means to rotate said saw blade in a loop with saw edges on two loop sides facing in opposite directions, means to hold said workpiece inside said saw blade loop, adjustable blade-guiding means to train said saw blade loop upon said workpiece, and means to rotate said saw blade about an axis passing in the plane of said loop through said workpiece to urge both said saw edges against said workpiece.

8. In a driven bandsaw machine as recited in claim 7 wherein said means to rotate said saw blade in a loop includes a pair of spaced pulleys, said bandsaw having one side twisted and then being mounted over said pulleys, and said means to rotate said saw blade loop includes a spaced pair of housings, means to rotatably mount each one of said pulleys in a different one of said housings, a spaced pair of frames, and means to mount each one of said housings in a different one of said frames to be rotatable about said axis.

9. In a driven bandsaw machine as recited in claim 8 wherein said adjustable means to train said saw blade loop upon a workpiece includes four guide rollers, two of said guide rollers being positioned along one side of said saw blade loop, the remaining two of said guide rollers being positioned along the other side of said saw blade loop, said saw blade passing between said guide rollers, said workpiece being enclosed by the portion of said loop between said guide rollers, adjustable means to hold said guide rollers, and means extending from each housing to support the closest adjustable means thereto.

10. In a driven bandsaw machine as recited in claim 9 wherein said spaced pulleys are mounted in said housings to be movable along said axis.

References Cited in the file of this patent

UNITED STATES PATENTS

| Number | Name | Date |
|---|---|---|
| 1,152,696 | Berry | Sept. 7, 1915 |
| 1,416,355 | Johnson | May 16, 1922 |
| 2,179,659 | Hartmann | Nov. 14, 1939 |
| 2,415,877 | Hajek | Feb. 18, 1947 |
| 2,595,073 | Griffith | Apr. 29, 1952 |

FOREIGN PATENTS

| Number | Country | Date |
|---|---|---|
| 425,154 | France | Mar. 29, 1911 |